(12) United States Patent
McCarren

(10) Patent No.: US 6,755,138 B2
(45) Date of Patent: Jun. 29, 2004

(54) VENTILATION SYSTEM AND METHOD

(75) Inventor: Gregory M. McCarren, Tryon, NC (US)

(73) Assignee: Woodlane Environmental Technology, Inc., Columbus, NC (US)

( * ) Notice: Subject to any disclaimer, the term of this patent is extended or adjusted under 35 U.S.C. 154(b) by 0 days.

(21) Appl. No.: 10/371,055

(22) Filed: Feb. 19, 2003

(65) Prior Publication Data

US 2003/0121513 A1 Jul. 3, 2003

Related U.S. Application Data

(62) Division of application No. 09/836,824, filed on Apr. 17, 2001.
(60) Provisional application No. 60/223,505, filed on Aug. 7, 2000.

(51) Int. Cl.[7] ............................. F28N 3/08; F28F 27/02
(52) U.S. Cl. ..................... 110/162; 165/154; 165/901; 236/1 G; 236/38
(58) Field of Search ..................... 165/154; 236/1 G, 236/38; 110/162

(56) References Cited

U.S. PATENT DOCUMENTS

| | | | |
|---|---|---|---|
| 1,313,085 A | | 8/1919 | Greene |
| 1,697,635 A | * | 1/1929 | Cornelius .................. 126/516 |
| 2,322,016 A | | 6/1943 | Hardeman |
| 3,685,506 A | * | 8/1972 | Mouat ...................... 126/531 |
| 3,800,689 A | | 4/1974 | Brown |
| 4,175,539 A | | 11/1979 | McGuire .................. 126/522 |
| 4,192,458 A | | 3/1980 | Pinnock et al. |
| 4,196,771 A | | 4/1980 | Nitteberg |
| 4,262,608 A | * | 4/1981 | Jackson ................... 110/162 |
| 4,270,513 A | * | 6/1981 | Mitchelson .............. 126/502 |
| 4,280,474 A | | 7/1981 | Ruegg, Sr. ............... 126/517 |
| 4,373,509 A | | 2/1983 | Neitzel et al. |
| 4,424,792 A | * | 1/1984 | Shimek et al. ........... 110/162 |
| 4,446,848 A | | 5/1984 | Becker et al. ............ 126/521 |
| 4,473,351 A | * | 9/1984 | Hill ............................ 432/2 |
| 4,497,361 A | | 2/1985 | Hajicek |
| 4,498,624 A | | 2/1985 | Kogut ......................... 237/53 |
| 4,545,360 A | * | 10/1985 | Smith et al. ............... 126/521 |
| 4,572,282 A | | 2/1986 | Ikemura et al. |
| 4,688,626 A | | 8/1987 | Tengesdal |
| 4,723,533 A | | 2/1988 | Cover |
| 5,069,272 A | | 12/1991 | Chagnot |
| 5,183,098 A | | 2/1993 | Chagnot |
| 5,303,693 A | | 4/1994 | Schroeter et al. ........... 126/522 |
| 5,307,801 A | | 5/1994 | Schroeter et al. ........... 126/515 |
| 5,460,162 A | * | 10/1995 | Binzer ....................... 126/517 |
| 5,482,028 A | | 1/1996 | Binzer ....................... 126/512 |
| 5,603,312 A | | 2/1997 | Champion et al. |
| 5,647,342 A | | 7/1997 | Jamieson et al. ........... 126/512 |
| 5,713,346 A | | 2/1998 | Kuechler |
| 5,904,137 A | | 5/1999 | Salley |
| 6,003,507 A | | 12/1999 | Flick et al. |
| 6,145,502 A | | 11/2000 | Lyons et al. |
| 6,321,997 B1 | * | 11/2001 | Kalsnes ...................... 237/46 |
| 2001/0042610 A1 | * | 11/2001 | Lyons et al. ................ 237/55 |

FOREIGN PATENT DOCUMENTS

GB 2157819 A * 10/1985 .................. 237/54

OTHER PUBLICATIONS

Advertising sheet: Condar "ASV–90 Air Supply Ventilator.", date unknown.
Field Controls Company "Draft Inducers" brochure. (1992).

* cited by examiner

Primary Examiner—Ira S. Lazarus
Assistant Examiner—James G. Barrow
(74) Attorney, Agent, or Firm—Carter Schnedler & Monteith, P.A.

(57) ABSTRACT

A balanced building ventilation system that employs a fireplace as an element of the ventilation system. The fireplace includes a firebox, and an exhaust gas flue is connected to the firebox for exhausting gas from the firebox to the outdoor ambient. A ventilation channel conveys outdoor ambient air into the building interior. A motor-driven draft inducer is connected to the exhaust gas flue for forcing exhaust gas flow out to the outdoor ambient. A motor-driven blower is provided for forcing ventilation airflow through the channel to replace building interior air lost to exhaust gas flow.

9 Claims, 9 Drawing Sheets

VENTILATION SYSTEM AND METHOD

CROSS-REFERENCE TO RELATED PATENT APPLICATIONS

This is a division of U.S. patent application Ser. No. 09/836,824, filed Apr. 17, 2001, which in turn claims the benefit of U.S. Provisional Patent Application Ser. No. 60/223,505, filed Aug. 7, 2000.

BACKGROUND OF THE INVENTION

The invention relates to balanced building ventilation systems.

Ventilation is desirable for many homes and other buildings. This is particularly so in view of modern construction practices resulting in structures which are relatively "tight." In other words, the interior is relatively sealed with reference to the outdoor ambient. Energy conservation, particularly in colder climates, is a major motivation.

Inadequate ventilation can cause moisture or odor problems within a building. Of perhaps greater concern, negative pressure inside a building can result in draft failure of combustion appliances such as water heaters and furnaces. Any combustion appliance requires a supply of combustion air. In some jurisdictions, building codes require that a building ventilation system be provided.

To address these concerns and, in some cases, building code requirements, a variety of air supply ventilators are commercially available. Some ventilators include motor-driven blowers. Other ventilators are simply passive openings. To avoid a cold draft and to reduce building heat loss as a result of ventilation, many air supply ventilators include an air-to-air heat exchanger, whereby outdoor ambient air entering the interior of the building is warmed by heat exchange with interior air exiting to the outdoor ambient. Fireplaces are often considered a desirable feature in a home. However, fireplaces present special problems. In particular, a fireplace is, in general, a de-pressurizing device, and can produce a negative building pressure. In some jurisdictions, when a home is built with a fireplace, building codes require that forced draft inducers be employed on combustion appliances such as gas water heaters and furnaces.

SUMMARY OF THE INVENTION

In one aspect, a system is provided for ventilating the interior of a building surrounded by an outdoor ambient. The system comprises a fireplace including a firebox, an exhaust gas flue connected to the firebox for exhausting gas from the firebox to the outdoor ambient, a motor-driven draft inducer connected to the exhaust gas flue for forcing exhaust gas flow out to the outdoor ambient, a channel for conveying outdoor ambient air into the building interior, and a motor-driven blower within the channel for forcing ventilation airflow into the building interior to replace building interior air lost to exhaust gas flow.

In another aspect, a fireplace heat recovery ventilator device is provided for use in combination with a fireplace within the interior of a building surrounded by an outdoor ambient, the fireplace including an exhaust gas flue connection for exhausting gas to the outdoor ambient. The device comprises a flue section connectable in series with the fireplace exhaust gas flue connection between the fireplace and the outdoor ambient; a motor-driven draft inducer connected to the flue section for forcing exhaust gas flow out to the outdoor ambient; a heat exchange structure attached to the flue section; a housing defining a chamber enclosing the heat exchange structure, the housing including an inlet connection connectable to one end of a fresh air inlet duct having another end connected to the outdoor ambient, and an outlet connection connectable to one end of a ventilation air delivery duct having another end connected to the building interior, the inlet and outlet connections being arranged such that air entering the inlet connection passes through the chamber past the heat exchange structure and exits via the outlet connection; and a motor-driven blower connected for forcing the ventilation airflow through the chamber and out through the ventilation air delivery duct into the building interior to replace building interior air lost to exhaust gas flow.

In yet another aspect, a method is provided for ventilating the interior of a building surrounded by an outdoor ambient. The method comprises providing a fireplace which includes an exhaust gas flue open to the outdoor ambient, providing a channel for conveying outdoor ambient air into the building interior, forcing exhaust gas flow out through the exhaust gas flue, and forcing ventilation airflow through the channel into the building interior to balance the exhaust gas flow.

Embodiments of the invention thus provide a ventilation system for a building, which ventilation system employs the fireplace as an element of the ventilation system, and which potentially satisfies code requirements for a ventilation system, in cases where there are such code requirements.

Embodiments of the invention have the effect of making the fireplace a pressure-neutral device, rather than being a de-pressurizing device. Potentially, in those jurisdictions where building codes require the provision of draft inducers on appliances such as gas water heaters and furnaces when a home has a fireplace, the code may be amended to not require such draft inducers when a fireplace is installed in combination with embodiments of the invention.

DETAILED DESCRIPTION

Figure 1:
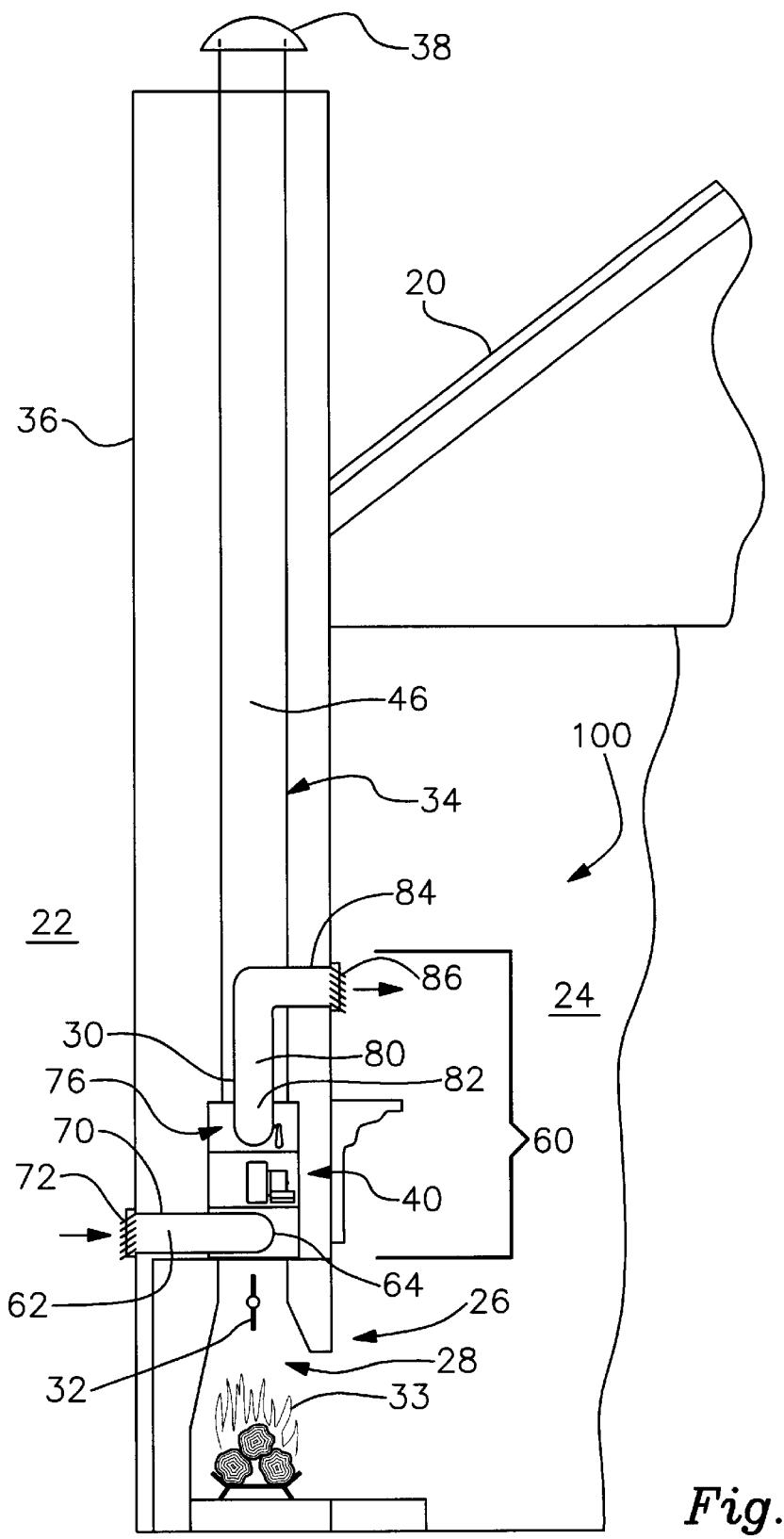
FIG. 1 is a representation of an embodiment of the invention installed in a house, viewed generally from the left side of the fireplace.

Referring first to FIG. 1, a building 20, represented as a house 20, is surrounded by an outdoor ambient 22, and has a building interior 24. In accordance with modern construction practices, the building 20 is relatively "tight." In other words, the structure of the building 20 itself is relatively sealed against the exchange of air between the outdoor ambient 22 and the building interior 24. In such situations, ventilation is desirable and, in some jurisdictions, even required by building codes.

Figure 2:
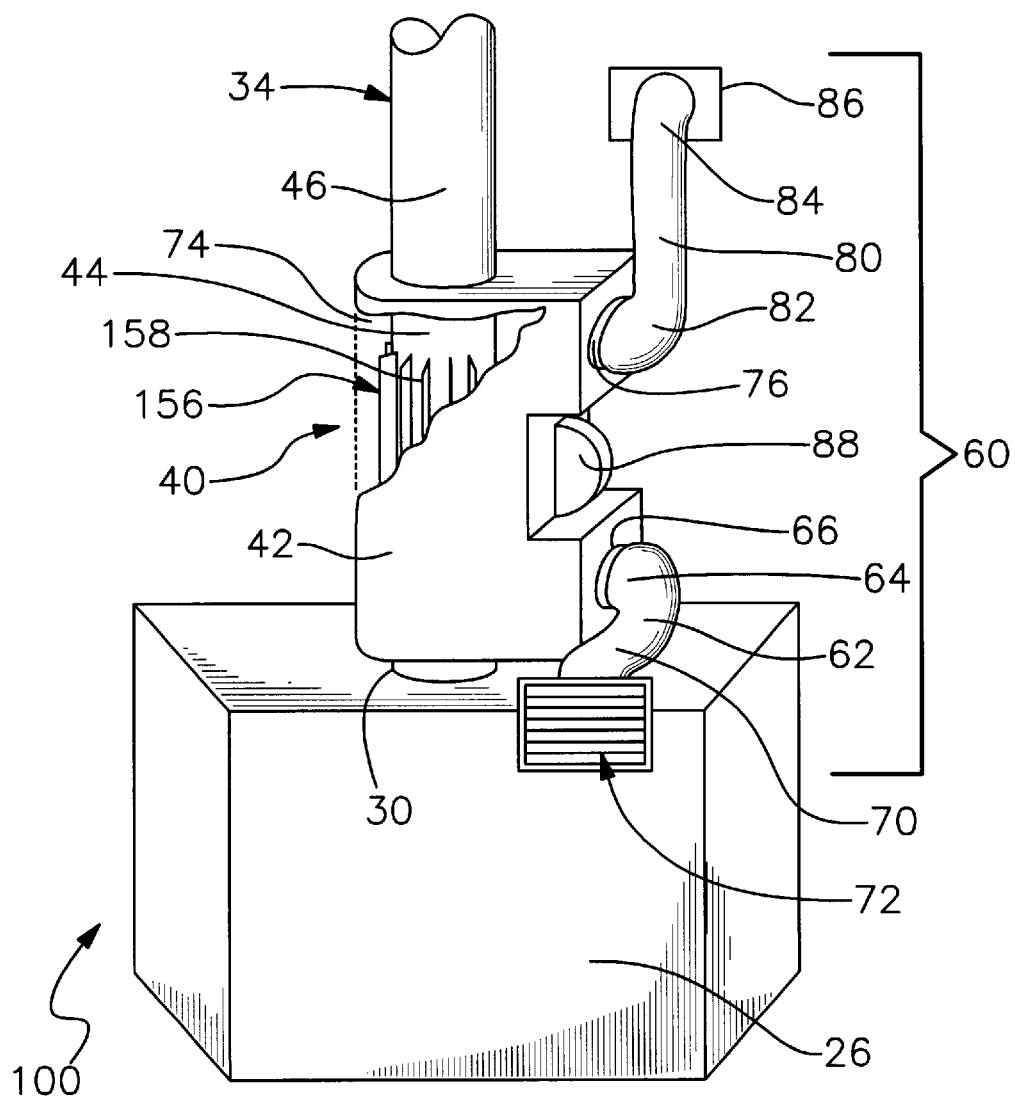
FIG. 2 is an enlarged three-dimensional view of a portion of the embodiment of FIG. 1, viewed from the rear of the fireplace, with portions broken away to show the heat exchanger.

Referring to FIG. 2, in addition to FIG. 1, installed within the building 20 is a fireplace 26 having a firebox 28 which includes an exhaust gas flue connection 30. In the embodiment of FIGS. 1 and 2, the firebox 28 and its exhaust gas flue connection 30 are of conventional construction. The fireplace 26 including the firebox 28 is representative of most commercially available wood-burning or gas-burning vented fireplace systems. The fireplace 26 has a conventional manually-operated flue damper 32. A representative fire 33 is shown burning in the fireplace 26.

From the firebox 28 exhaust gas flue connection 30, a flue 34 extends upwardly through a chimney 36, to an opening 38 to the outdoor ambient 22 at the top of the flue 34.

Also shown in FIGS. 1 and 2 is a heat recovery ventilator device embodying the invention, generally designated 40. Within an outer housing 42, the heat recovery ventilator device 40 includes a cylindrical flue section 44 (FIGS. 2–9). The flue section 44 comprises a portion of the overall flue 34, and is connected in series between the firebox 28 exhaust gas flue connection 30 and a flue extension 46, which comprises the remaining portion of the overall flue 34. Thus, exhaust gas exiting the building interior 24 through the fireplace 26 is conducted through the flue section 44 and the flue extension 46, before exiting through the opening 38 to the outdoor ambient 22. For sensing the presence of a fire within the fireplace 26, such as the fire 33, as well as the relative size of any fire, representative temperature sensors 48 and 50 are thermally connected to the flue section 44 within the ventilator device 40.

Represented generally in FIGS. 1 and 2 is a ventilation channel 60 for conveying air from the outdoor ambient 22 into the building interior 24. The ventilation channel 60 includes as one portion a fresh air inlet duct 62. One end 64 of the duct 62 is connected to an inlet connection 66 on the housing 42 of the heat recovery ventilator device 40. The inlet connection 66 takes the particular form of a short section 68 of duct. The other end 70 of the duct 62 is connected to the outdoor ambient 22, and is covered by an outside air intake grille 72. Within the ventilator device 40, air entering through the inlet connection 66 is conveyed to a heat exchange chamber 74 which is shown in FIG. 2 as well as in FIGS. 6–9 and which comprises another portion of the ventilation channel 60. Air from the heat exchange chamber 74 is conveyed, again within the ventilator device 40, to an outlet connection 76 on the housing 42. The outlet connection 76 takes the particular form of another short section 78 of duct. The ventilation channel 60 includes as yet another portion a ventilation air delivery duct 80 having one end 82 connected to the outlet connection 76. The other end 84 of the duct 80 is connected for delivering air to the building interior 24, and is covered by a warmed fresh air distribution grille 86.

For forcing exhaust gas flow out to the outdoor ambient 22, the heat recovery ventilator device 40 additionally includes a motor driven draft inducer 88 within the flue 34, more particularly within the flue section 44. In addition, for forcing ventilation airflow into the building interior 24 to replace building interior air lost to exhaust gas flow, the device 40 includes a motor-driven blower 90 within the ventilation channel 60. In the illustrated embodiment, the motor-driven blower 90 is within the duct section 68 comprising the inlet connection 66 of the heat recovery ventilator device 40.

The fireplace 26, the exhaust gas flue 34, the ventilation channel 60 and the heat recovery ventilator device 40 together comprise a system, generally designated 100, for ventilating the interior 24 of the building 20.

Accordingly, and in overview, air within the building interior 24 exits via the fireplace 26, is mixed with combustion products (in the event there is a fire within the fireplace 26), and passes through the flue section 44 of the heat recovery ventilator device 40 and through the flue extension 46 to exit via the opening 38 to the outdoor ambient 22. At the same time, ventilation airflow from the outdoor ambient 22 is conveyed through the channel 60 (which includes the fresh air inlet duct 62, the heat exchange chamber 74 within the heat recovery ventilator device 40, and the ventilation air delivery duct 80) into the building interior 24 to replace building interior air lost to exhaust gas flow. In addition, within the heat recovery ventilator device 40, in particular within the heat exchange chamber 74, heat is exchanged between gas exhausted through the exhaust gas flue 34 to air conveyed through the channel 60, so as to warm air from the outdoor ambient 22 prior to entry into the building interior 24. However, there is no exchange of gasses between exhaust gas within the flue 34 and ventilation airflow within the channel 60.

The system 100 is adjusted such that forced ventilation airflow through the channel 60 balances forced exhaust gas flow out through the fireplace 26 and through the flue 34. As described in greater detail hereinbelow, included adjustments allow for outgoing and incoming flows (which may be expressed as air volumes) to be matched to each other, despite varying static pressures within the ventilation channel 60 and the exhaust gas flue, and to allow for both the rates of exhaust gas flow and ventilation airflow (which, again may be expressed as air volumes) to be increased or reduced while maintaining a balanced relationship.

The system 100 can be employed as a ventilation system for the building 20 when there is no fire in the fireplace 26, thus satisfying building code requirements for a ventilation system where such code requirements exist, without regard to the additional functioning as a fireplace. Thus, the flue 34 associated with the wood-burning or gas-burning fireplace 26 is employed as the exhaust component of a balanced building ventilation system. Heat from the exhausted flue gasses and room air may be exchanged to fresh incoming air.

A variety of operational modes are possible. In one operational mode or configuration, the system 100 is operated as a full-time ventilation system with the motor-driven draft inducer 88 and the motor-driven blower 90 operating at all times, but typically at reduced speeds. When there is a fire in the fireplace 28, such as the fire 33, as sensed by one of the temperature sensors 48 and 50, the speeds of the motor-driven draft inducer 88 and the motor-driven blower 90 are automatically increased as required, while maintaining the fireplace 26 as a pressure-neutral device with reference to the building interior 24 and the outdoor ambient 22.

In another operational mode or configuration, the motor-driven draft inducer 88 and the motor-driven blower 90 are not operated at all when there is no fire in the fireplace 26. When one of the temperature sensors 48 and 50 senses a fire in the fireplace 26, the motor-driven draft inducer 88 and the motor-driven blower 90 are activated. Staged operation may also be employed. Thus, when there is a relatively smaller fire in the fireplace 26 and a relatively lower temperature is sensed, the motor-driven draft inducer 88 and the motor-driven blower 90 are activated to operate at reduced speeds. When there is a relatively larger fire in the fireplace 26, the motor-driven draft inducer 88 and the motor-driven blower 90 are automatically activated to operate at full speed, again while maintaining the fireplace 26 as a pressure-neutral device.

The system 100 thus provides fresh ventilation air to balance building interior 24 air exhausted through the fireplace 26, maintaining a neutral effect on the pressures existing within the building interior 24, both during operation of the fireplace 26, that is when there is a fire within the firebox 28, and when the fireplace 26 is not operating. The system 100 does not interfere with normal operation of the fireplace 26 in the event of an electrical power outage, when the motor-driven draft inducer 88 and the motor-driven blower 90 are not operational.

Figure 3:
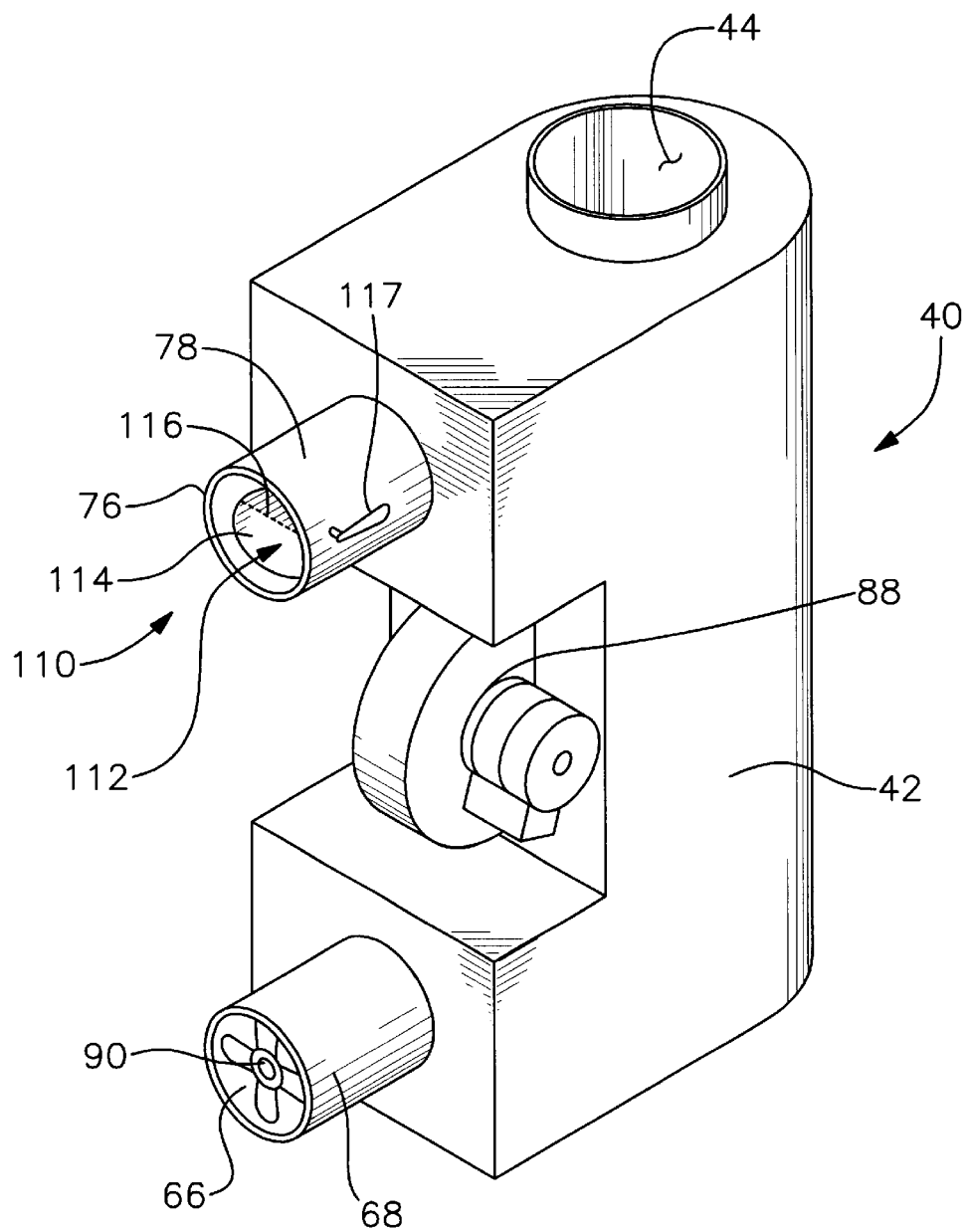
FIG. 3 is a three-dimensional view of the exterior of a fireplace heat recovery ventilator device embodying the invention and included in the system of FIG. 1, generally from the top left front thereof.
Figure 4:
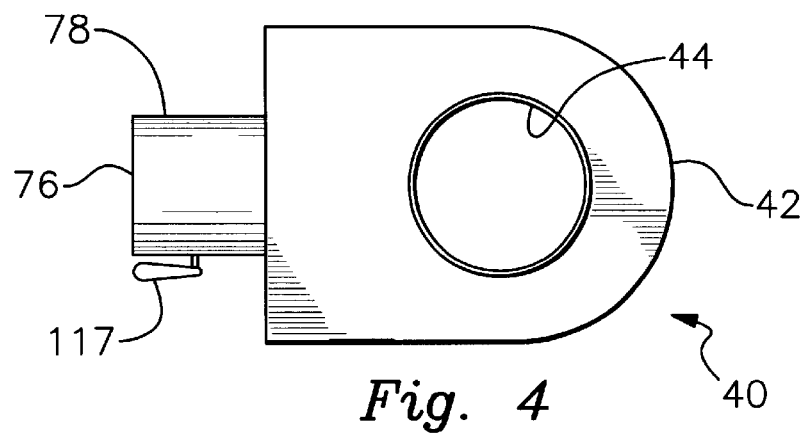
FIG. 4 is a top plan view of the ventilator device of FIG. 3.
Figure 5:
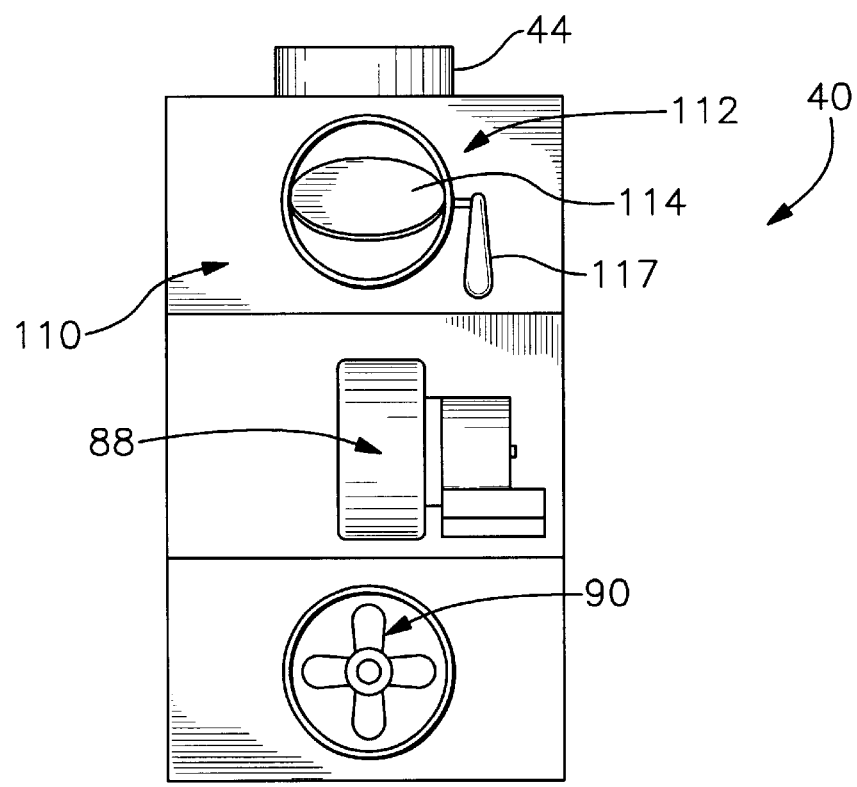
FIG. 5 is a left side elevational view of the ventilator device of FIG. 3.

FIGS. 3–5 are exterior views of the heat recovery ventilator device 40. As described above with reference to FIGS. 1 and 2, the device 40 includes an outer housing 42 surrounding the flue section 44. Supported by the housing 42 are the inlet connection 66 duct section 68 and the outlet connection 76 duct section 78 comprising elements of the ventilation channel 60. Within the outlet duct section 78 is an air flow adjustment, generally designated 110, in the form of an adjustable damper 112. The damper 112 includes a damper plate 114 which is rotatable on a shaft 116 over an operational range of less than 90°. A handle 117 is provided for manual adjustment. The particular form of air flow adjustment 110 depicted is exemplary only. Thus; other forms of air flow adjustment may be implemented, such as blower 90 motor speed control. Additionally, the adjustable damper 112 may be located somewhere else within the ventilation channel 60.

Figure 6:
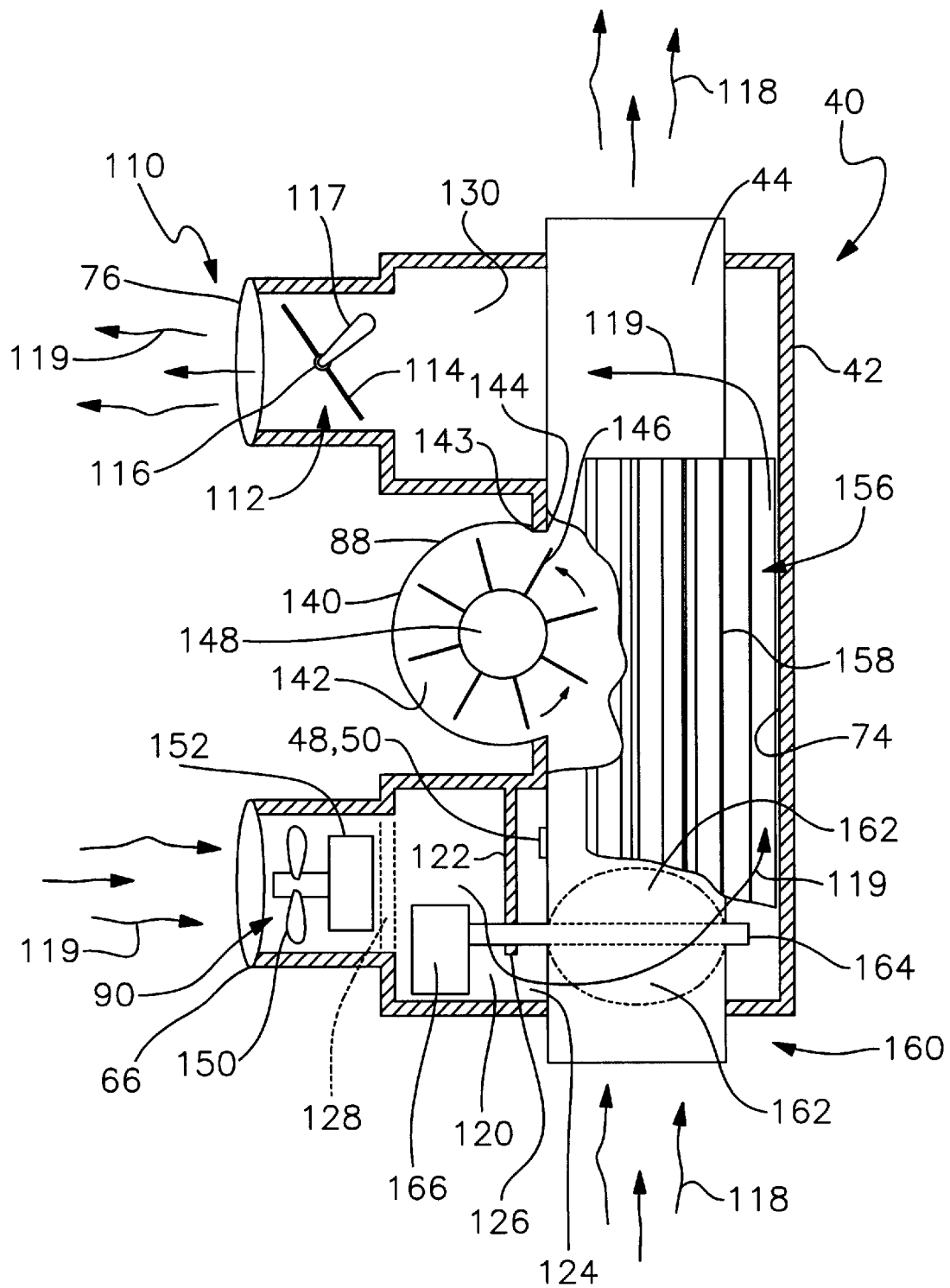
FIG. 6 is a left side elevational view, partly broken away and partially in section, of the heat recovery ventilator device of FIG. 3.
Figure 7:
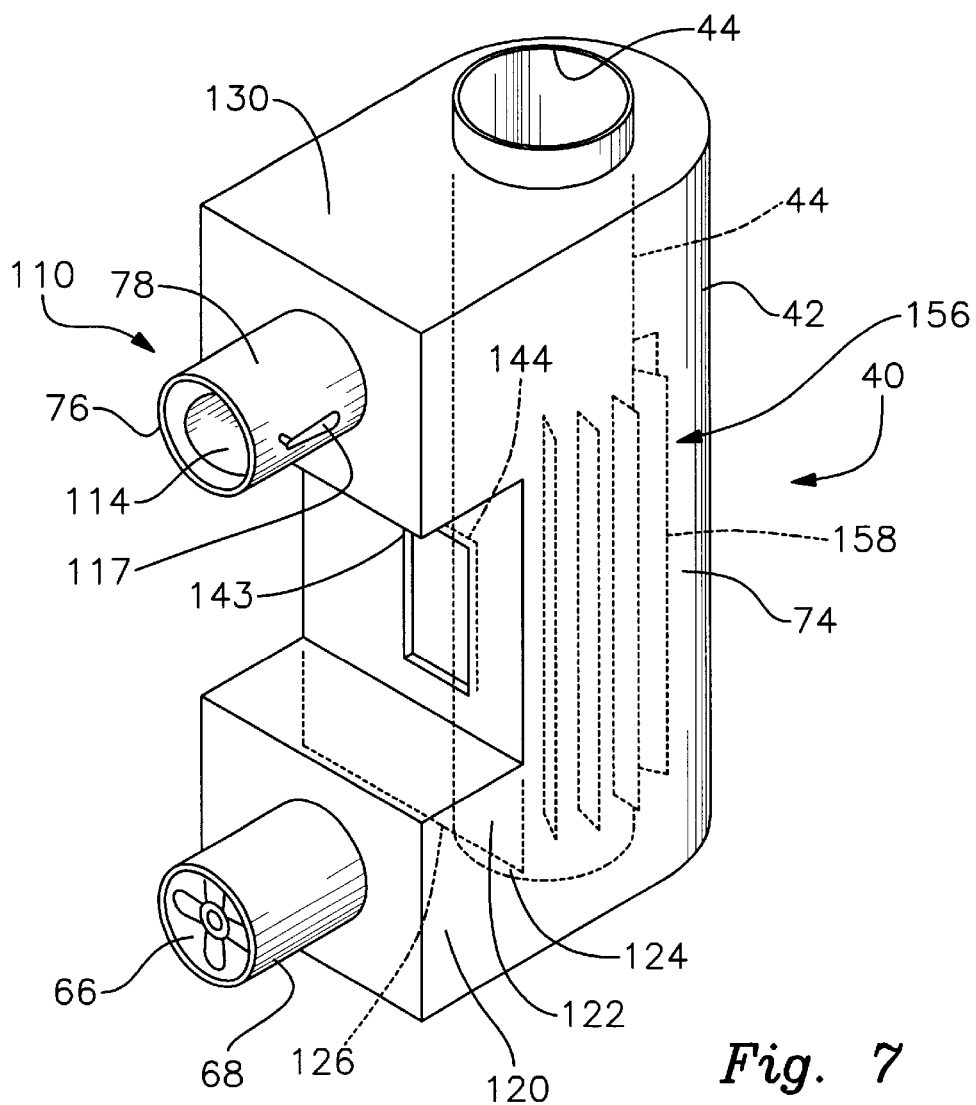
FIG. 7 is a three dimensional view, in the same orientation as FIG. 3, depicting steel partitions and heat exchange structure internal to the heat recovery ventilator device, and with a motor-driven draft inducer visible in FIG. 3 removed for clarity of illustration in FIG. 7.
Figure 8:
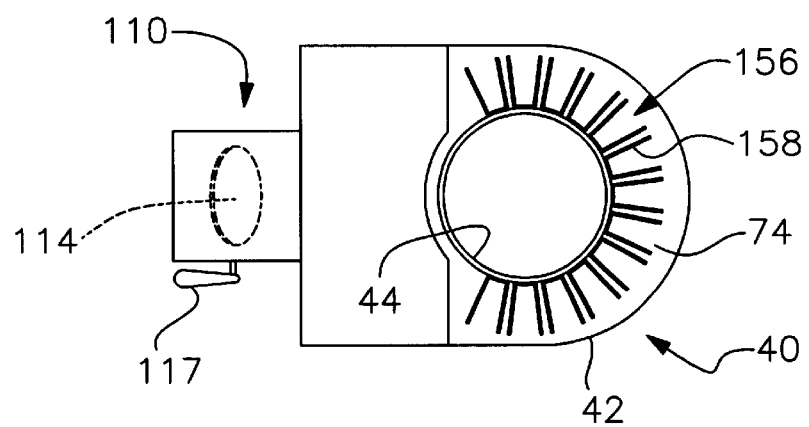
FIG. 8 is a view from the top, in the same orientation as FIG. 4 but partially broken away, corresponding to FIG. 7.
Figure 9:
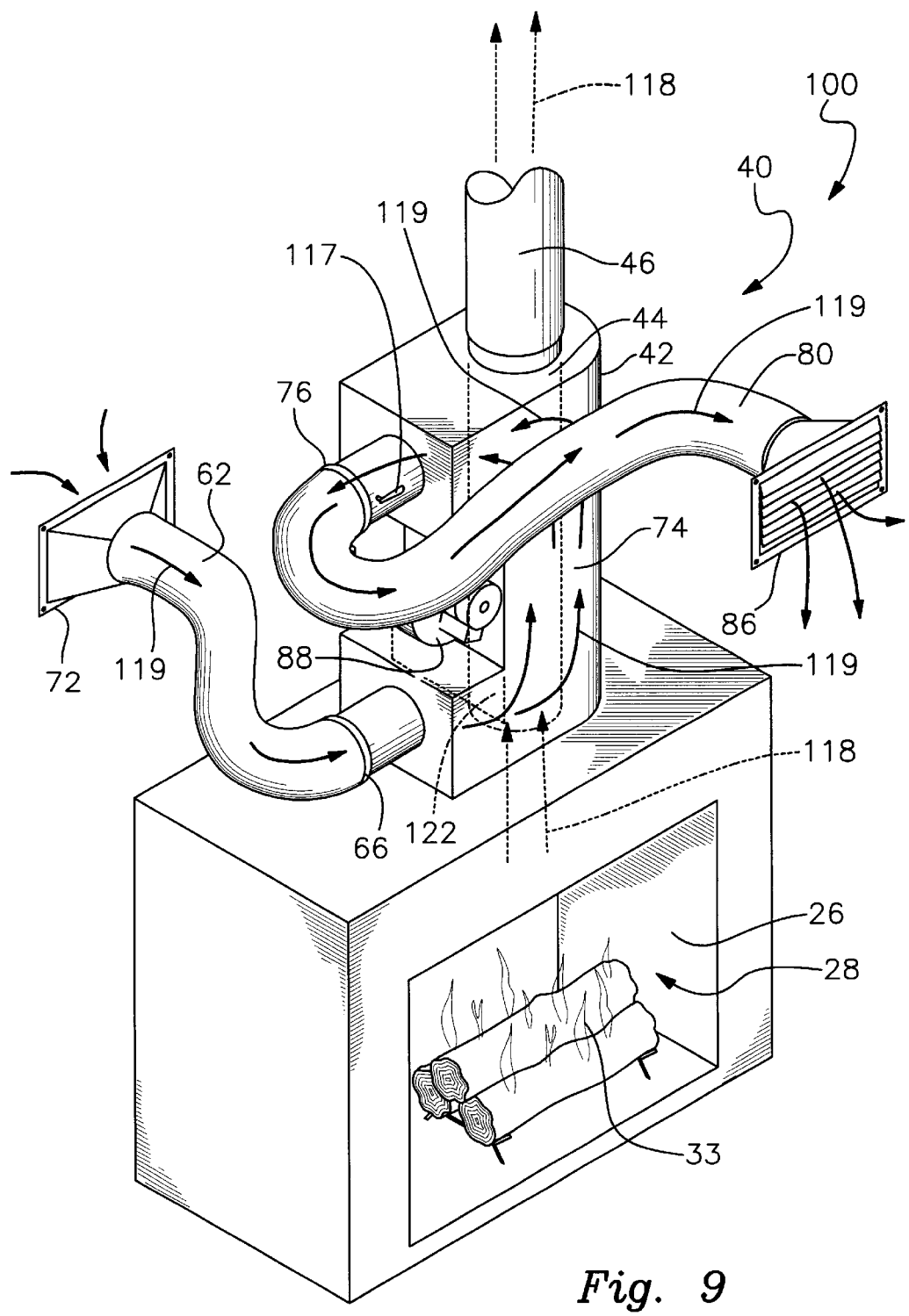
FIG. 9 is an enlarged three-dimensional view of the same portion of the embodiment of FIG. 1 as is depicted in FIG. 2, but viewed generally from the top left front, with portions broken away to show the paths of exhaust gas flow and ventilation airflow.

FIGS. 6–8 show interior structure of the heat recovery ventilator device 40 in greater detail, and FIG. 9 is an overview of the system showing exhaust gas and ventilation air flow. In FIGS. 6 and 9, arrows 118 represent the flow of exhaust gas flow through the flue section 44 (and through the flue extension 46 in FIG. 9). Arrows 119 represent the flow of ventilation airflow through the inlet and outlet connections 66 and 76, and through the chamber 74. Both exhaust gas flow 118 through the flue section 44 and ventilation airflow 119 through the chamber 74 are in an upward direction, in the same direction as is naturally induced by convection. Thus, in the event the motor-driven blower 90 is not operating, such as in the event of a power failure, there is still some flow 119 of warmed ventilation air into the building interior 24.

Ventilation air entering the device 40 through the inlet connection 66 is delivered first to an entry chamber 120 adjacent the lower end of the ventilator device 40. The chamber 120 is defined in part by an interior partition wall 122 that has an opening 124 along the lower end 126 thereof for introducing outside air into the lower end of the heat exchange chamber 74. Within the entry chamber 120 is a replaceable air filter 128. In a similar manner, the ventilator device 40 includes adjacent its upper end an exit chamber 130 that receives warmed ventilation air which has passed upwardly through the heat exchange chamber 74, and which exits past the adjustable damper 112 to the outlet connection 76.

The motor-driven draft inducer 88 is commercially available, and may for example be a Field Controls Model DI-1. The draft inducer 88 includes a housing 140 defining an impeller chamber 142 which is open at one end. In the particular construction disclosed, the housing 42 is formed such that, at the point where the draft inducer 88 is mounted, the outer housing 42 contacts the flue section 44 and conforms to the cylindrical surface thereof. Matching rectangular apertures 143 and 144 are formed in the outer housing 42 and flue section 44, respectively. The draft inducer 88 housing 140 is attached in a gas-tight manner to the flue section 44, over the rectangular apertures 143 and 144. Fasteners (not shown), which may be the same fasteners that attach the draft inducer 88, hold the outer housing 42 of the ventilator device 40 and the flue section 44 tightly together around the perimeter of the apertures 143 and 144. Accordingly, exhaust gas within and exhausted through the flue section 44 is in direct communication with the interior of the impeller chamber 142, but is otherwise confined so as to not escape into the building interior 24, either directly or through communication with the ventilation channel 60. Rotating within the impeller chamber 142 is a vaned impeller 146, driven by an electric motor 148. Vanes of the impeller 146 project partially into the flue section 44 so as to induce a draft when the draft inducer 88 is activated by energizing the electric motor 148, causing the vaned impeller 146 to rotate.

The motor-driven blower 90 within the inlet duct section 68 includes an impeller 150 in the representative form of a fan blade 150, driven by an electric motor 152. A suitable blower 90 is a Field Controls Model JR-2. Other forms of motor-driven blowers may be employed for forcing ventilation airflow, such as a squirrel cage blower. When the motor-driven blower 90 is activated by energizing the electric motor 152, the fan blade 150 rotates so as to force ventilation airflow through the ventilation channel 60.

For exchanging heat between gas exhausted through the exhaust gas flow 34 to air conveyed through the channel 60, a heat exchanger, generally designated 156, is included within the heat recovery ventilator device 40. In the illustrated embodiment, the heat exchanger 156 takes the form of a heat exchange structure 158 attached to the flue section 44 in a manner which provides good thermal contact. More particularly, the heat exchange structure 158 takes the form of a plurality of vertically-extending fins 158 that project into the heat exchange chamber 74 defined by the device 40 housing 42. Thus, ventilation airflow passing through the ventilation channel 60, more particularly through the heat exchange chamber 74 portion of the ventilation channel 60, is warmed as it passes through the heat exchange chamber 74 past the heat exchange structure 158. It will be appreciated that the particular heat exchanger 156 illustrated is representative only, and that a variety of heat exchangers may be employed.

As an option, the ventilator device 40 includes, within the lower portion of the flue section 44, a motorized flue damper, generally designated 160. The motorized flue damper 160 includes a disc-like vane which rotates on a shaft 164 over an operational range of 90°, driven by an electric damper motor 166. As is conventional, to provide "fail-safe" operation in the event of a power failure, the damper motor 166 operates to close the damper 160 when the damper motor 166 is energized, and a spring (not shown) rotates the shaft 164 and the vane 162 so as to open the flue damper 160 when the damper motor 166 is not energized. A suitable motorized flue damper is a Honeywell Model D896.

Figure 10:
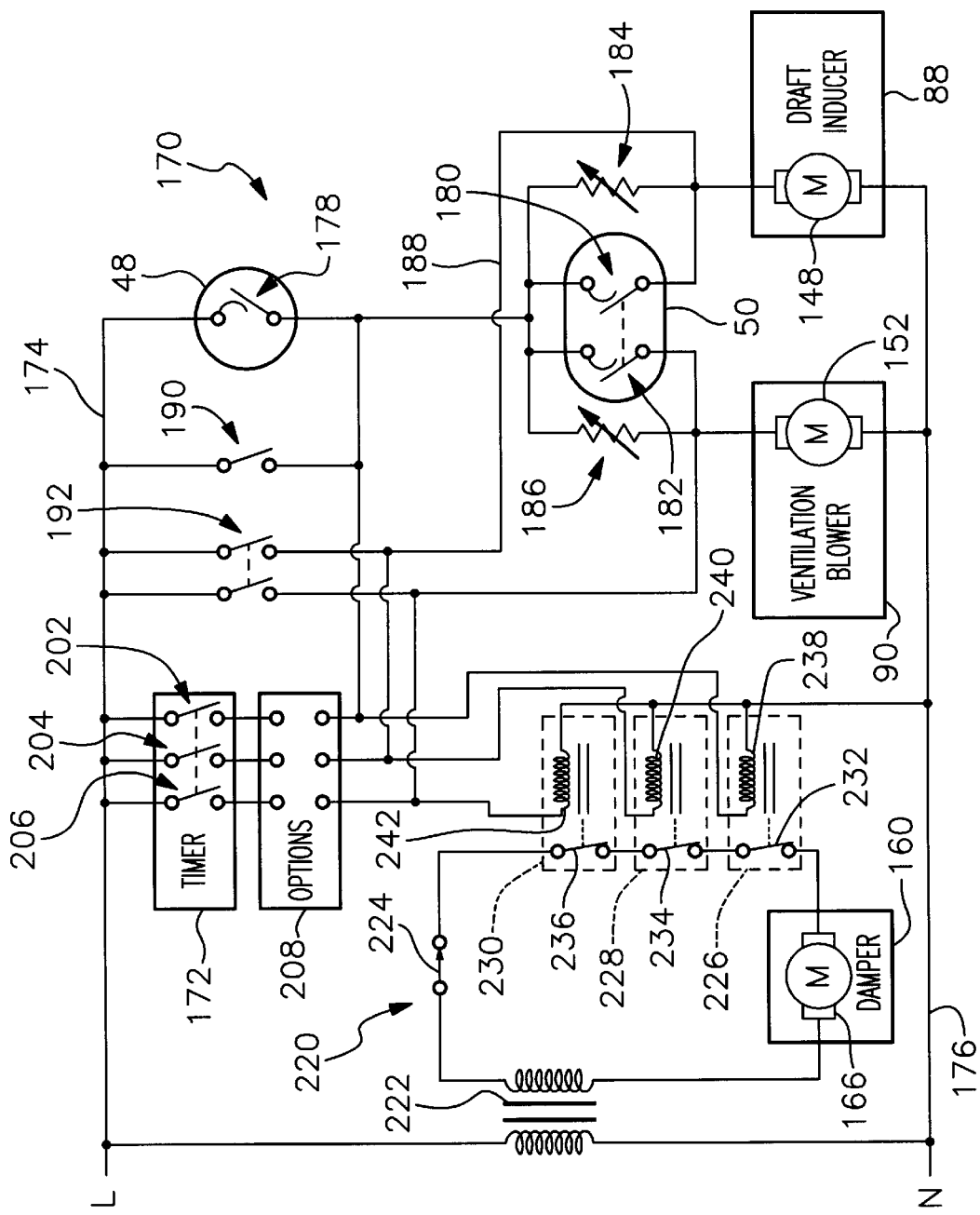
FIG. 10 is an electrical schematic diagram of representative circuitry included in the heat recovery ventilator device of FIG. 3.

FIG. 10 is a representative electrical schematic diagram of control circuitry 170 included as part of the heat recovery ventilator device 40. Some elements depicted in the electrical schematic diagram of FIG. 10 are optional, such as the motorized flue damper 160 and a timer 172. Although the control circuitry 170 of FIG. 10 is shown as employing conventional electro-mechanical components, it will be appreciated that the various control functions described herein may be implemented in a controller which is more electronic in nature. The electro-mechanical circuitry shown, however, is particularly convenient for purposes of representing and describing the various control functions.

The circuitry 170 includes line and neutral conductors 174 and 176 which are respectively connected to a 117 volt AC power source represented by "L" and "N" terminals. Operated components represented in FIG. 10, in addition to the motorized flue damper 160 and its motor 166, are the draft inducer 88 and its motor 148, as well as the ventilation blower 90 and its electric motor 152.

The temperature sensors 48 and 50 described hereinabove in the representative circuit 170 of FIG. 10 more particularly comprise mechanical thermostats. It will be appreciated, however, that thermistors or other forms of solid-state temperature sensors may be employed, operating in cooperation with suitable electronic circuitry (not shown) to accomplish the described functions.

The illustrated embodiment provides the option of staged operation whereby the draft inducer 88 and ventilation blower 50 are operated either at reduced or full speeds, depending upon the size of a fire in the fireplace 26. Thus, the sensor 48 more particularly comprises a first thermostat that is responsive to a relatively lower temperature. The thermostat 48 has a set 178 of normally-open contacts that close when a first temperature set point is reached. In an exemplary embodiment, the contacts 178 close or turn ON when sensed temperature reaches 100° F., and subsequently open or turn OFF when sensed temperature falls below 85° F. The other temperature sensor 50 more particular comprises a second thermostat that is responsive to a relatively higher temperature. The thermostat 50 has two electrically isolated sets 180 and 182 of normally-open contacts that close when a second temperature set point is reached. In the exemplary embodiment, the contacts 180 and 182 close or turn ON when sensed temperature reaches 150° F., and subsequently open or turn OFF when sensed temperature falls below 135° F. The particular second thermostat 50 illustrated is a double pole thermostat which maintains electrical isolation between two controlled circuits. This functionality can be implemented by a pair of thermostats adjusted so that their respective contacts close and open at approximately the same temperatures.

Although a pair of temperature sensors 48 and 50 are illustrated, the control functions described herein can be implemented employing a single temperature sensor, such as a thermistor or other solid-state temperature-responsive device, in combination with electronic control circuitry (not shown) to implement one or more temperature set points for staged operation.

Motor speed controls, generally designated 184 and 186, are provided for the motor-driven draft inducer 88 and the motor-driven blower 90, respectively. In FIG. 10, the motor speed controls 184 and 186 take the representative form of rheostats 184 and 186, electrically connected in series with the motors 148 and 152, respectively. It will, however, be appreciated that solid state motor speed controls (not shown) may as well be employed and, further, that such a solid state motor speed control (not shown) may be implemented in combination with circuitry responsive to a signal from a thermistor or other form of solid-state temperature sensor.

The first thermostat 48 is connected in series between the "L" conductor 174 and an intermediate conductor 188, so as to energize the intermediate conductor 188 when the contacts 178 of the first thermostat 48 close. The rheostat 184 is connected in series with the motor 128 of the draft inducer 88 between the intermediate conductor 188 and the "N" conductor 176 so that, when the intermediate conductor 188 is energized, the draft inducer 88 operates at a reduced speed as determined by the setting of the rheostat 184. Similarly, the rheostat 182 is connected in series with the motor 152 of the ventilation blower 90 between the intermediate conductor 188 and the "N" conductor 176, so that the ventilation blower 90 operates at a reduced speed as determined by the setting of the rheostat 186 when the intermediate conductor 188 is energized. The contacts 180 and 182 of the second thermostat 50 are electrically connected so as to bypass the rheostats 184 and 186, respectively. When the contacts 180 and 182 close, the draft inducer 88 and the ventilation blower 90 operate at full speed.

In the operation of the FIG. 10 circuitry as thus far described, when there is a relatively smaller fire in the fireplace 26, the temperature of the flue section 44 begins to increase. When the first thermostat 48 senses a temperature of 100° F., the contacts 178 close, energizing intermediate conductor 188, and activating the draft inducer 88 and the ventilation blower 90 to operate at reduced speeds as determined by the settings of the respective motor speed control rheostats 184 and 186. Thereafter, when the size of the fire has increased with a corresponding increase in the temperature of the flue section 44, and the second thermostat 50 senses a temperature of 150° F., the contacts 180 and 182 close, bypassing the rheostats 184 and 186, and activating the draft inducer 88 and the ventilation blower 90 to each operate at full speed.

Manually-operated switches are provided for test and adjustment purposes, and can also be employed for setting installation options. In particular, a first test switch 190 having a single set of contacts (SPST) is connected so as to bypass the contacts 178 of the first thermostat 48 when the first test switch 190 is closed. A second test switch 192 has a pair of contacts (DPDT) and is connected between the "L" conductor 174 and the motors 148 and 152 of the draft inducer 88 and ventilation blower 90, thus bypassing the contacts 180 and 182 of the second thermostat 50, as well as the contacts 178 of the first thermostat 48 so as to manually operate the draft inducer 88 and the ventilation blower 90 at full speed when the second test switch 192 is closed.

In a typical adjustment procedure, the second test switch 192 is closed so as to operate both the draft inducer 88 and the ventilation blower 90 at full speed. Employing suitable measurement instruments, such as a vane anemometer and/or a flow hood, the ventilation airflow is adjusted by means of the air adjustment damper 112 positioned within the outlet duct section 78, so that the ventilation airflow balances the exhaust gas flow. After balancing at the high setting, the second test switch 192 is opened and the first test switch 190 is closed, so that the draft inducer 88 and ventilation blower 90 operate at reduced speeds as determined by the settings of the representative rheostats 184 and 186. By adjusting the settings of the rheostats 184 and 186, the speeds of the draft inducer 88 and ventilation blower 90 are adjusted, again so that ventilation airflow balances exhaust gas flow. At the option of the installer, the rheostat 184 can be set so as to operate the draft inducer 88 at a desired speed, and then the rheostat 186 adjusted so that the ventilation blower 90 operates at a speed which achieves balance. Alternatively, the rheostat 186 can be set to a desired ventilation blower 90 speed, and then the rheostat 184 controlling the speed of the draft inducer 88 adjusted as required, again until the ventilation airflow and the exhaust gas flow are in balance.

In the illustrated embodiment, adjustment to balance at the relatively higher speeds of the draft inducer 88 and the ventilation blower 90 is effected by means of the damper 112. However, this adjustment also may comprise a motor speed control, either of the ventilation blower 90 motor 152, or of the draft inducer 88 motor 148.

As noted hereinabove, a variety of operational modes are possible. Thus, in the one operational mode referred to hereinabove, the switch 190 is closed upon installation, so that the draft inducer 88 and ventilation blower 90 operate at all times, but at reduced speeds as determined by settings of the rheostats 184 and 186. The first thermostat 48 is not used. When the temperature of the flue section 44 is sufficient to close the contacts 180 and 182 of the second thermostat 50, the rheostats 184 and 186 are bypassed, so that the draft inducer 88 and ventilation blower 90 both operate at full speed.

In the other operational mode or configuration referred to hereinabove, both the switches 190 and 192 are employed only as test switches for initial adjustment, and are left open following installation. Accordingly, the motor-driven draft inducer 88 and the motor-driven blower 90 are not operated at all when there is no fire in the fireplace, and two-speed staged operation results when there is a fire.

Also shown in FIG. 10 is the optional timer 172, including a timer motor (not shown), and a set of three isolated timer contacts 202, 204 and 206. By means of configurable connections associated with the timer contacts 202, 204 and 206, as represented by an option wiring block 208, an installer can set up the system 100 so that the timer 172, at desired times, operates the draft inducer 88 and ventilation blower 90 either at full speed or reduced speed (as installation options), regardless of whether there is a fire in the fireplace. Thus, if the timer contact 202 is employed, the system 100 operates to effect ventilation at reduced draft inducer 88 and ventilation blower 90 speeds under timer control. If timer contacts 204 and 206 are selected at the option wiring block 208, the draft inducer 88 and ventilation blower 90 operate to effect ventilation at full speed under control of the timer 172.

The motorized flue damper 160 is another option, and has an associated damper circuit 220 powered by a transformer 222 having an exemplary 24 volt AC output voltage. Whenever AC line voltage is available across the line and neutral conductors 174 and 176 and the damper circuit 220 is closed, the damper motor 166 is energized, opening the damper vane 162. When there is any interruption in the damper circuit 220, the damper motor 166 is de-energized, and the spring-loaded damper plate 162 closes.

For manually opening the damper 160, the damper circuit 220 includes a normally-closed series-connected switch 224 which is manually opened whenever a user intends to build a fire in the fireplace, in the same way as the damper is conventionally opened in a fireplace before building a fire.

In addition, to automatically open the damper 160 whenever the draft inducer 88 and the ventilation blower 90 are operating, either at reduced or full speed, and whether due to activation by the thermostats 48 and 50, the switches 190 and 192, or the timer 172, there is provided a set of three relays 226, 228 and 230. The relays 226, 228 and 230 have respective normally-closed contacts 232, 234 and 236 connected in series within the damper circuit 220. The relays 226, 228 and 230 also have respective relay coils 238, 240 and 242, which each have one terminal connected to the neutral conductor 176. The other relay coil terminals are connected to the intermediate conductor 188 and to the terminals of the motors 148 and 152 such that, whenever the draft inducer 88 and ventilation blower 90 are activated, at least one of the relay coils 238, 240 and 242 is energized to opening its respective normally-closed contacts 232, 234 or 236. This ensures that the damper circuit 220 and thus the motorized flue damper 160 are opened. Three separate relays 226, 228 and 230 are employed to maintain isolation between the various circuit paths for energizing the draft inducer 88 and 90. Equivalent functionality can be achieved by other forms of control circuitry, including control circuitry which is electronic in nature (not shown).

Figure 11:
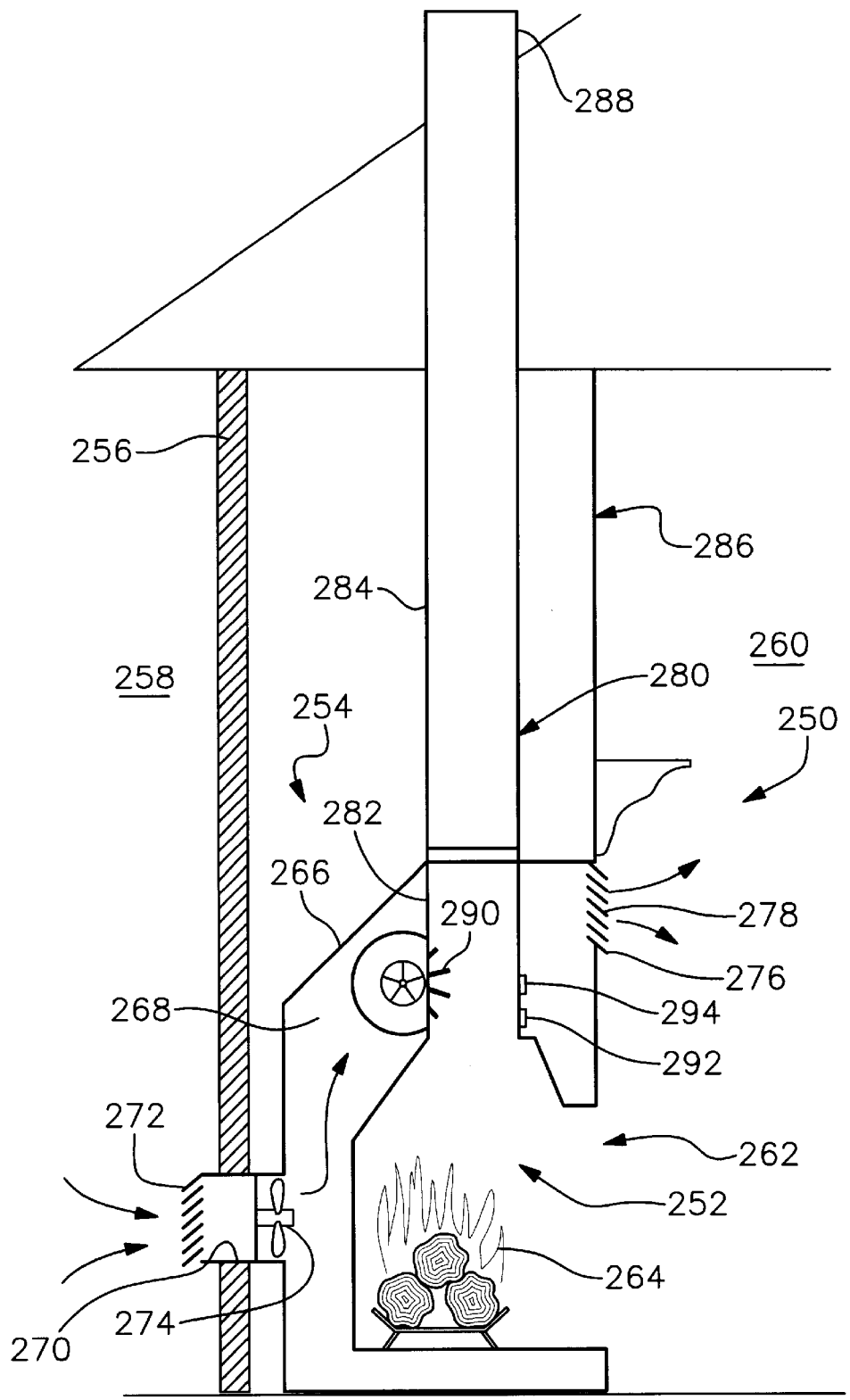
FIG. 11 depicts another embodiment of the invention, wherein a heat exchanger transfers heat from a fire within the firebox to outdoor ambient air being conveyed into the building interior.

Referring finally to FIG. 11, depicted is another system 250 embodying the invention, differing from the system 100 described hereinabove in that heat exchange is between a firebox 252 and air within a ventilation channel, generally designated 254, for outdoor ambient air.

More particularly, in FIG. 11, a building 256, represented as a house 256, is surrounded by an outdoor ambient 258, and has a building interior 260. Installed within the building 256 is a fireplace 262, including the firebox 252, with a representative fire 264 burning in the fireplace 262.

The fireplace 262 comprises an assembly including an outer housing 266 defining a chamber 268, which serves as part of the ventilation channel for conveying air from the outdoor ambient 258 into the building interior 260. An intake air duct 270 communicates between the outdoor ambient 258 and the chamber 268. The intake air duct 270 is covered by an outside air intake grille 272. The intake air duct 270 also comprises a portion of the ventilation channel 254.

Within the intake air duct 270 is a motor-driven blower 274, which serves the same function as the motor-driven blower 90 of the embodiment described hereinabove.

The chamber 268 has an air outlet opening 276 covered by a warmed fresh air distribution grille 278, for directing warmed fresh air into the building interior 260.

Connected to the firebox 252 is an exhaust gas flue, generally designated 280, including an exhaust gas flue section 282 within the fireplace structure 262, and an exhaust gas flue extension 284 which extends through a chimney 286 to an opening 288.

A motor-driven draft inducer 290 is connected to the exhaust gas flue section 282 for forcing exhaust gas flow out to the outdoor ambient 258, in the same manner as the motor-driven draft inducer 88 attached to the flue section 44 of the embodiment described hereinabove. A pair of temperature sensors 292 and 294 are connected to the flue section 282, and operate in the same manner as the temperature sensors 48 and 50 of the first embodiment described hereinabove.

In the embodiment of FIG. 11, the back side of the firebox 252 serves as a heat exchanger for transferring heat from the fire 264 within the firebox 252 to air conveyed through the ventilation channel 254, in particular air within the chamber 268, so as to warm the outdoor ambient air prior to entry into the building interior 260. To enhance heat transfer, a suitable heat exchange structure, such as fins (not shown), may be attached to the back side of the firebox 252.

The system 250 of FIG. 11 operates in generally the same manner as the system 100 described hereinabove, including the various control functions. The temperature sensors 292 and 294 function in the same manner as the temperature sensors 48 and 50. The motor-driven blower 274 operates in the same manner as the motor-driven blower 90, and the motor-driven draft inducer 290 operates in the same manner as the motor-driven draft inducer 88. The control circuitry 170 of FIG. 10 is equally applicable.

While specific embodiments of the invention have been illustrated and described herein, it is realized that numerous modifications and changes will occur to those skilled in the art. It is therefore to be understood that the appended claims are intended to cover all such modifications and changes that fall within the true spirit and scope of the invention.

What is claimed is:

1. A fireplace heat recovery ventilator device for use in combination with a fireplace within the interior of a building surrounded by an outdoor ambient, the fireplace including an exhaust gas flue connection for exhausting gas to the outdoor ambient, said device comprising:

a flue section connectable in series with the fireplace exhaust gas flue connection between the fireplace and the outdoor ambient;

a motor-driven draft inducer connected to said flue section for forcing exhaust gas flow out to the outdoor ambient;

a heat exchange structure attached to said flue section;

a housing defining a chamber enclosing said heat exchange structure;

said housing including an inlet connection connectable to one end of a fresh air inlet duct having another end connected to the outdoor ambient, and an outlet connection connectable to one end of a ventilation air delivery duct having another end connected to the building interior, said inlet and outlet connections being arranged such that air entering said inlet connection passes through said chamber past said heat exchange structure and exits via said outlet connection;

a motor-driven blower connected for forcing ventilation airflow through said chamber and out through the ventilation air delivery duct into the building interior to replace building interior air lost to exhaust gas flow; and a temperature sensor thermally connected to said flue section and electrically connected to said draft inducer and to said blower for initiating forced exhaust gas flow and forced ventilation airflow when there is a fire in the fireplace.

2. A fireplace heat recovery ventilator device for use in combination with a fireplace within the interior of a building surrounded by an outdoor ambient, the fireplace including an exhaust gas flue connection for exhausting gas to the outdoor ambient, said device comprising:

a flue section connectable in series with the fireplace exhaust gas flue connection between the fireplace and the outdoor ambient;

a motor-driven draft inducer connected to said flue section for forcing exhaust gas flow out to the outdoor ambient;

a heat exchange structure attached to said flue section;

a housing defining a chamber enclosing said heat exchange structure;

said housing including an inlet connection connectable to one end of a fresh air inlet duct having another end connected to the outdoor ambient, and an outlet connection connectable to one end of a ventilation air delivery duct having another end connected to the building interior, said inlet and outlet connections being arranged such that air entering said inlet connection passes through said chamber past said heat exchange structure and exits via said outlet connection;

a motor-driven blower connected for forcing ventilation airflow through said chamber and out through the ventilation air delivery duct into the building interior to replace building interior air lost to exhaust gas flow; and a temperature sensor thermally connected to said flue section and electrically connected to said draft inducer and to said blower for increasing the rates of exhaust gas flow and ventilation airflow when there is a fire in the fireplace.

3. A fireplace heat recovery ventilator device for use in combination with a fireplace within the interior of a building surrounded by an outdoor ambient, the fireplace including an exhaust gas flue connection for exhausting gas to the outdoor ambient, said device comprising:

a flue section connectable in series with the fireplace exhaust gas flue connection between the fireplace and the outdoor ambient;

a motor-driven draft inducer connected to said flue section for forcing exhaust gas flow out to the outdoor ambient;

a heat exchange structure attached to said flue section;

a housing defining a chamber enclosing said heat exchange structure;

said housing including an inlet connection connectable to one end of a fresh air inlet duct having another end connected to the outdoor ambient, and an outlet connection connectable to one end of a ventilation air delivery duct having another end connected to the building interior, said inlet and outlet connections being arranged such that air entering said inlet connection passes through said chamber past said heat exchange structure and exits via said outlet connection;

a motor-driven blower connected for forcing ventilation airflow through said chamber and out through the ventilation air delivery duct into the building interior to replace building interior air lost to exhaust gas flow;

a first thermostat having a relatively lower temperature set point, said first thermostat being thermally connected to said flue section and electrically connected to activate said draft inducer and said blower to operate at a reduced speed when there is a relatively smaller fire in the fireplace; and a second thermostat having a relatively higher temperature set point by said second thermostat being thermally connected to said flue section and electrically connected to activate said draft inducer and said blower to operate at full speed when there is a relatively larger fire in the fireplace.

4. A fireplace heat recovery ventilator device for use in combination with a fireplace within the interior of a building surrounded by an outdoor ambient, the fireplace including an exhaust gas flue connection for exhausting gas to the outdoor ambient, said device comprising:

a flue section connectable in series with the fireplace exhaust gas flue connection between the fireplace and the outdoor ambient;

a motor-driven draft inducer connected to said flue section for forcing exhaust gas flow out to the outdoor ambient;

a heat exchange structure attached to said flue section;

a housing defining a chamber enclosing said heat exchange structure;

said housing including an inlet connection connectable to one end of a fresh air inlet duct having another end connected to the outdoor ambient, and an outlet connection connectable to one end of a ventilation air delivery duct having another end connected to the building interior, said inlet and outlet connections being arranged such that air entering said inlet connection passes through said chamber past said heat exchange structure and exits via said outlet connection;

a motor-driven blower connected for forcing ventilation airflow through said chamber and out through the ventilation air delivery duct into the building interior to replace building interior air lost to exhaust gas flow; and an adjustment to facilitate adjustment of either the ventilation airflow or the exhaust gas flow so that the ventilation airflow balances the exhaust gas flow.

5. The device of claim 4, which further comprises an adjustable damper to facilitate adjustment of the ventilation airflow to balance the exhaust gas flow.

6. The device of claim 4, which further comprises a blower motor speed control to facilitate adjustment of the ventilation airflow to balance the exhaust gas flow.

7. The device of claim 4, which further comprises:

an adjustable damper to facilitate adjustment of the ventilation airflow to balance the exhaust gas flow when said motor-driven draft inducer and said motor-driven blower are operating at full speed; and a blower motor speed control to facilitate adjustment of the ventilation airflow to balance the exhaust gas flow when said motor-driven draft inducer and said motor driven blower are each operating at a reduced speed.

8. The device of claim 4, which further comprises:

an adjustable damper to facilitate adjustment of the ventilation airflow to balance the exhaust gas flow when said motor-driven draft inducer and said motor-driven blower are operating at full speed; and a draft inducer motor speed control to facilitate adjustment of the exhaust gas flow so as to be balanced by the ventilation airflow when said motor-driven draft inducer and said motor-driven blower are each operating at a reduced speed.

9. The device of claim 4, which further comprises:

an adjustable damper to facilitate adjustment of the ventilation airflow to balance the exhaust gas flow when said motor-driven draft inducer and said motor-driven blower are operating at full speed; and a blower motor speed control and a draft inducer motor speed control to facilitate adjustment such that the ventilation airflow balances the exhaust gas flow when said motor-driven draft inducer and said motor-driven blower are each operating at a reduced speed.

* * * * *